Oct. 22, 1968 J. P. WHEELER 3,407,354
MOTOR AND SELF-SYNCHRONOUS GENERATOR FREQUENCY SYNCHRONIZATION UNITS FOR SWEPT FREQUENCY SECRET COMMUNICATIONS SYSTEM
Filed April 9, 1942
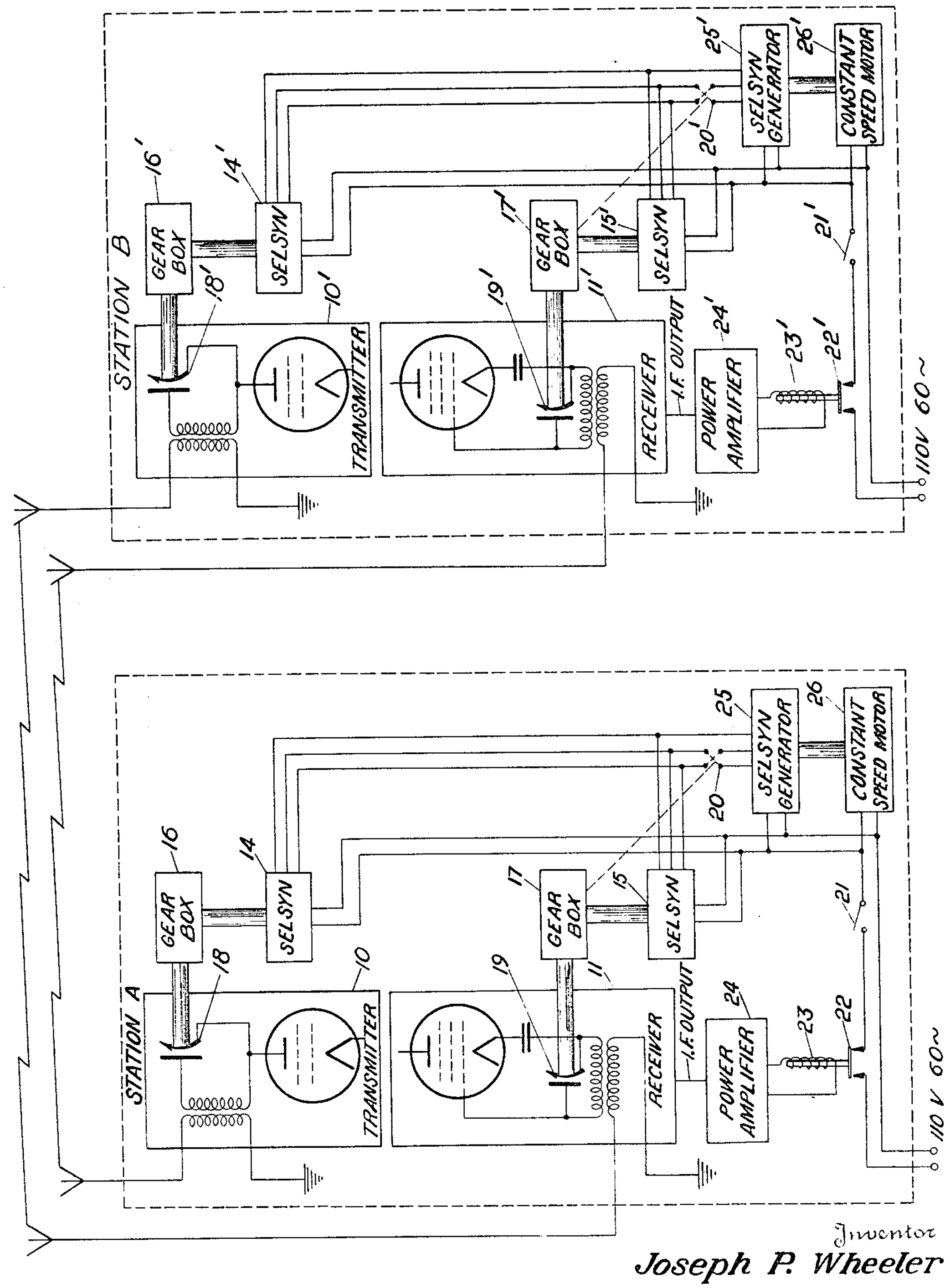
Inventor
Joseph P. Wheeler
By [signature]
Attorney 3,407,354
Patented Oct. 22, 1968

3,407,354

MOTOR AND SELF-SYNCHRONOUS GENERATOR FREQUENCY SYNCHRONIZATION UNITS FOR SWEPT FREQUENCY SECRET COMMUNICATIONS SYSTEM

Joseph P. Wheeler, % Naval Research Laboratory, Washington, D.C. 20360

Filed Apr. 9, 1942, Ser. No. 438,322
1 Claim. (Cl. 325—35)

This invention relates to a system by means of which two-wave radio communication may be maintained with substantially no possibility of detection by anyone not equipped with apparatus constructed according to the invention.

It is an object of this invention to provide such a system in a form which is simple and rugged.

It is a further object of this invention to provide a communication system which utilizes a plurality of transmitting and receiving units located at a plurality of separated stations, all of which units vary continuously in frequency during their operation, the frequency variation of all units being synchronized.

It is another object of this invention to provide a communication system as set forth above in which the operation of a transmitting unit at one of the stations automatically sets into operation a receiving unit at each of the other stations and sets the frequency variations of these units into operation in synchronism with the frequency variations of said transmitting unit.

It is another object of this invention to provide a method of two-wave radio communication which is safe from detection by undesired persons.

Other objects will become apparent from a careful consideration of the following description when taken with the accompanying drawing, the single figure of which is a schematic representation of a communication system embodying the invention.

In the preferred form of the invention the system comprises a transmitting and a receiving unit located at each of the stations between which it is desired to maintain communication. In the drawing a pair of such stations are indicated by the boxes marked station A and station B. A transmitter 10 and a receiver 11 are shown in station A while station B is provided with transmitter 10' and receiver 11'. In carrying out the invention the frequency of the transmitter and receiver of each station is caused to vary in a predetermined manner by the use of synchronized driving means simultaneously varying the tuning of the input circuit of the receiver and the tank circuit of the oscillator of the transmitter. Thus a pair of self-synchronous motors 14 and 15 are shown in station A driving through gear boxes 16 and 17 the variable condensers 18 and 19 in the tank circuit of the transmitter and in the tuned antenna coupling circuit of the receiver, respectively. The stator windings of the motors 14 and 15 are connected in a three-phase circuit in parallel with the stator windings of a self-synchronous generator 25 driven by a constant speed motor 26 having its speed vary carefully regulated. The rotor of each motor and the generator is supplied from a common source of 110 v. A.C. voltage. The A.C. supply is interrupted by a starting switch 21 and a relay switch 22. The relay switch is actuated by a solenoid 23 for which power is supplied by a power amplifier 24 to which is fed the I.F. output of receiver 11. A reversing switch 20 is located in the three-phase circuit ahead of the motors and is operated mechanically by suitable stops (not shown) cooperating with the gearing in gear box 17, to reverse the direction of rotation of the motors 14 and 15 at desired points in the tuning range of the variable condensers. Station B is supplied with identical equipment, the various elements of which are numbered the same as the corresponding elements in station A with the exception that the numbers are primed. The motor 26' must run at the same speed as motor 26.

The operation of the device is as follows:

It will be assumed that the starting switches 21, 21' are closed, the A.C. supply lines, however, remaining open due to the relay switch 22. If now it is desired to open communication from station A the relay switch 22 is closed manually, thus setting into operation selsyn motors 14 and 15. These motors now drive variable condensers 18 and 19 at a predetermined rate of speed and thus continuously increase or decrease the frequency of the transmitter and the receiver. The reversing switch 20 is provided so that as the condensers 18 and 19 approach the limits of their variation in one direction the directional movement of the self-synchronous motors may be reversed to reverse the direction of variation of the condensers. By changing the gear ratio in the gear boxes 16 and 17 the rate of movement of the condensers may be varied without varying the speed of the motors. Transmitter 10 now begins to transmit at a frequency which varies in a predetermined manner. The receiver 11' has been constructed to operate with the same predetermined variation of frequencies by virtue of the motor 15' driving its variable condenser 19'. However, the receiver not being in operation, the setting of the condenser 19' may be at any point within that range. Neverthless, as the frequency of condenser 18 continues to vary, the transmitter 10 will finally transmit the frequency at which receiver 11 is set to respond. Reception of the signal will, through the power amplifier 24', actuate relay switch 22' to close the A.C. supply circuit to motor 15' and thus commence movement of variable condenser 19'. If the reversing switch 20 is properly set the motor 15' will continue to operate to vary the condenser 19' so that the frequencies of receiver 11' track those of transmitter 10. However, if the reversing switch 20' is set in a manner to produce rotation of motor 15' in a direction opposite to that of motor 14 movement of motor 15' will quickly tune the receiver out of the signal from transmitter 10, the relay 22' will reopen and the receiver will cease to operate, until continued movement of condenser 18 brings it back again to the setting of condenser 19', with the motor 14 moving in the same direction for which motor 15' is set.

Once receiver 11' and transmitter 10 are tracking, they will continue to do so throughout the range of frequency variation of transmitter 10. Any person attempting to intercept the message would catch only very short bits of it as the frequency of the transmitter passed through the frequency being watched and detection would be impossible unless the frequency of the detecting receiver could by some means be made to track that of transmitter 10.

Once the receiver 11' is tracking transmitter 10 all four motors will be operating in synchronism. The motor 14' will be varying the setting of condenser 18' in a predetermined manner and the motor 15 will be varying the setting of condenser 19 in a manner to cause receiver 11 to constantly track transmitter 10'. While the operation of all the motors must be synchronized, it is not necessary that the pattern of frequency variation of transmitter 18' follow that of transmitter 18. Transmitters 10 and 10' may transmit on different frequencies or their frequency variations may move in opposite directions simultaneously without adverse results. It is only necessary that receiver 11' track transmitter 10 and receiver 11 track transmitter 10'.

Thus two-way communication may be maintained on separate frequency bands, if desired, and on frequencies which constantly change and thus defy detection. It is necessary that each transmitter transmit a broad enough band of frequencies to allow some time lag for the mechanical operation of the relays 22 and 22' and allow also for the motors 15 and 15' to come into operation. Thus if the band transmitted were to narrow, by the time the receiver was in operation, the variation of the transmitter frequency would have moved the signal beyond the frequency setting of the receiver.

As an example of values which may be employed, the motors 26 and 26' may operate as 1800 r.p.m. and drive the variable condensers through reduction gearing in gear boxes 16, 16', 17 and 17' at speeds around one-sixth r.p.m. The frequency of the system may vary through a band of 100 kc. in width, for example, from 500 to 1500 kc. and the instantaneous transmitter band width may be 20 kc.

In order to obtain additional security, it is possible to vary the frequency changing cycle both as to time and the sequence of movement. However, the introduction of such variations must be in accordance with a prearranged schedule. Many means of varying both the speed and sequence of variation will suggest itself to those skilled in the art, such as substitution of gear trains of various ratios, use of cams and other means of obtaining variable motion from a fixed driving means.

While the disclosure has been limited to one embodiment of the invention, many departures therefrom both in arrangement and substitution of elements within the scope of the invention as defined by the appended claims, will suggest themselves to those skilled in the art.

The invention described herein may be manufactured and used by or for the Government of the United States of America for governmental purposes without the payment of any royalties thereon or therefor.

I claim:

1. A secret communication system comprising at least a pair of stations, a transmitter unit and a receiver unit in each station, means to vary the frequency of the transmitter unit and the receiver unit of each station through a predetermined cycle of variations, the cycle of variations of each of said transmitter units being identical with that of the receiver unit in the other station of said pair, said means to vary the frequency in each of said stations comprising a variable frequency determinative element controlling the frequency thereof, a self-synchronous motor connected to said variable frequency determinative element to vary the tuning thereof a self-synchronous generator driving said motor, and a motor driving said self-synchronous generator, means supplying electrical energy to said last named motors, means normally interrupting said supply and means actuated by the reception of a signal by said receiver to render said interrupting means ineffective.

References Cited

UNITED STATES PATENTS

| | | | |
|---|---|---|---|
| 431,651 | 7/1890 | Delany | 178—53.1 X |
| 1,501,711 | 7/1924 | Heising | 178—53.1 X |
| 1,540,313 | 6/1925 | Chaplin | 178—53.1 |
| 1,592,940 | 7/1926 | Kendall | 179—1.5 |
| 1,596,251 | 8/1926 | Hammond | 325—34 |
| 1,607,485 | 11/1926 | Schmidt | 325—35 |
| 1,628,411 | 5/1927 | Kranz | 325—33 X |
| 1,634,390 | 7/1927 | Zworykin | 325—32 |
| 2,333,719 | 11/1943 | Herold. | |
| 2,491,540 | 12/1949 | Wiseman et al. | 325—20 |

FOREIGN PATENTS

| | | | |
|---|---|---|---|
| 206,499 | 7/1924 | Great Britain. | |

ROBERT L. GRIFFIN, *Primary Examiner.*

B. V. SAFOUREK, *Assistant Examiner.*